No. 705,937. Patented July 29, 1902.
J. LEE.
MACHINE FOR APPLYING SOLDER TO METAL BLANKS.
(Application filed Dec. 7, 1900.)
(No Model.) 3 Sheets—Sheet 1.
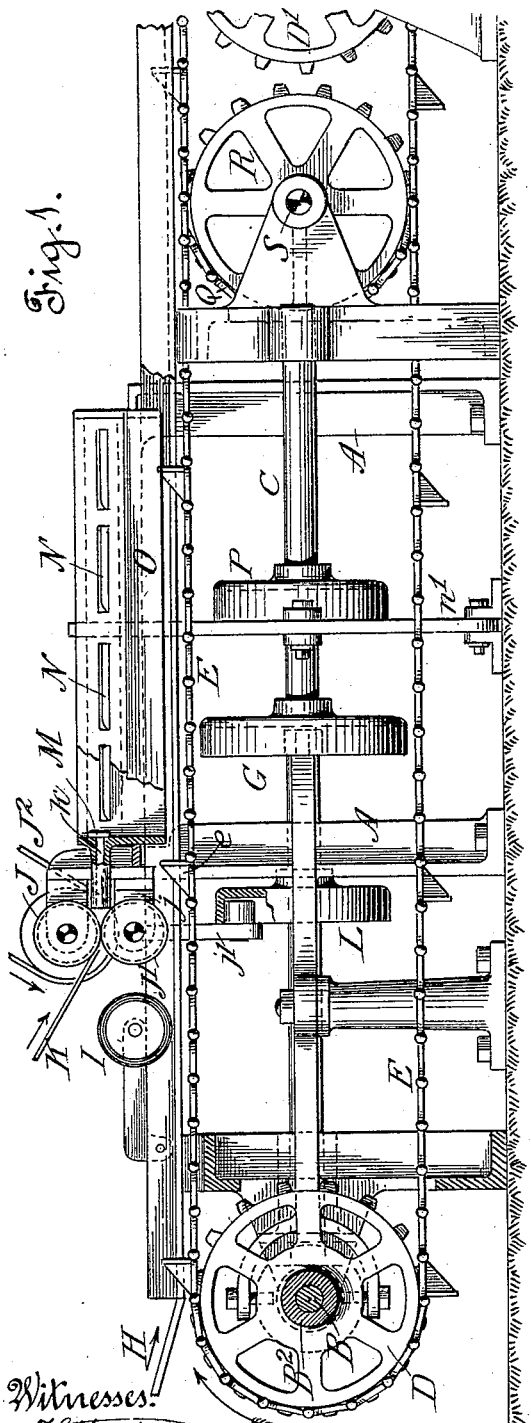
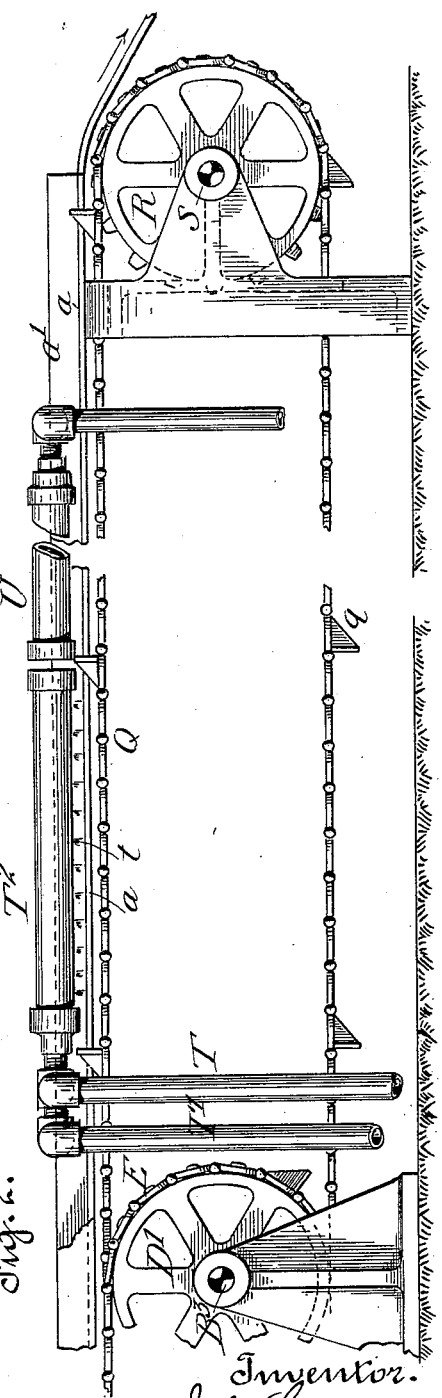

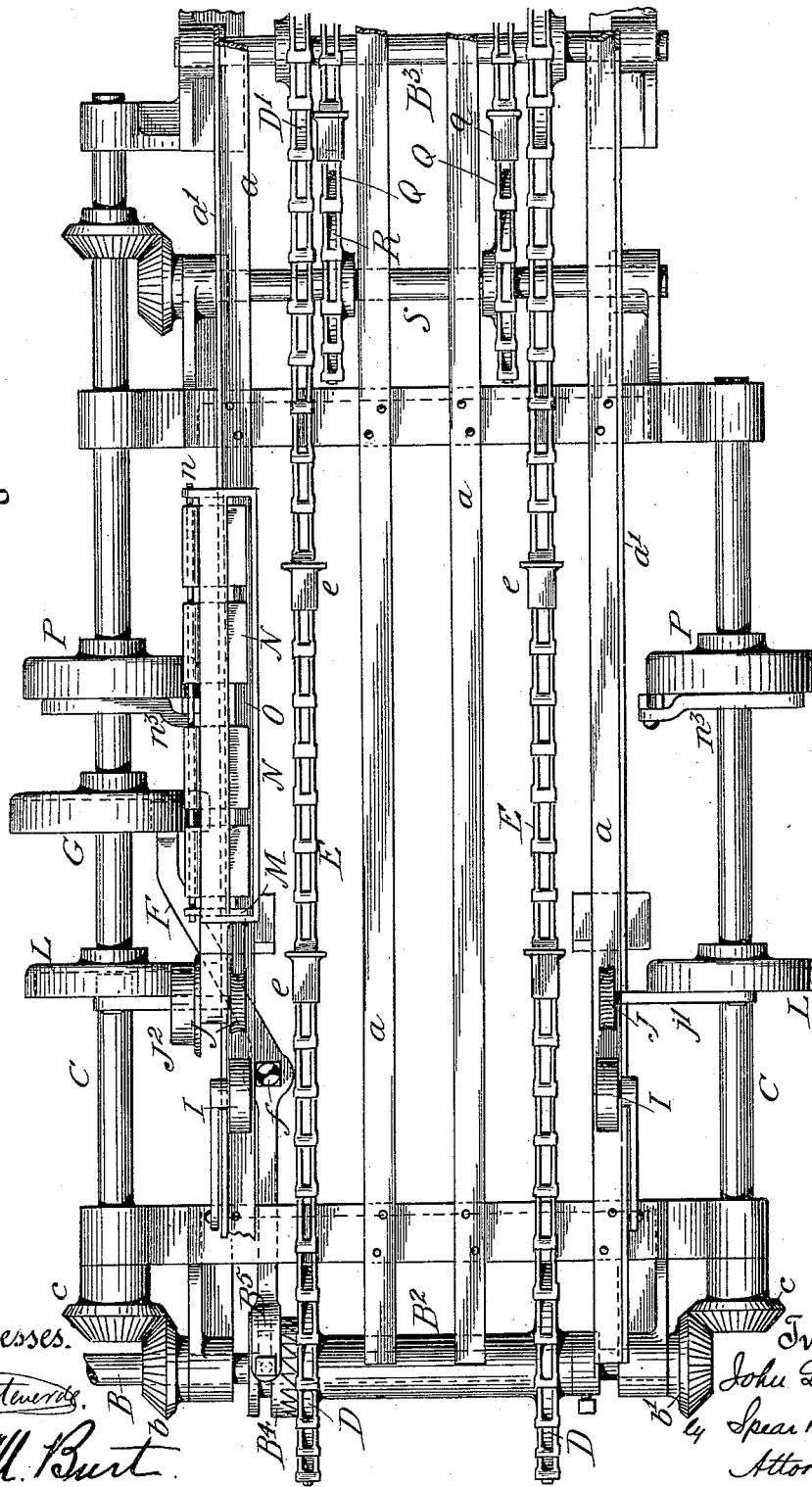

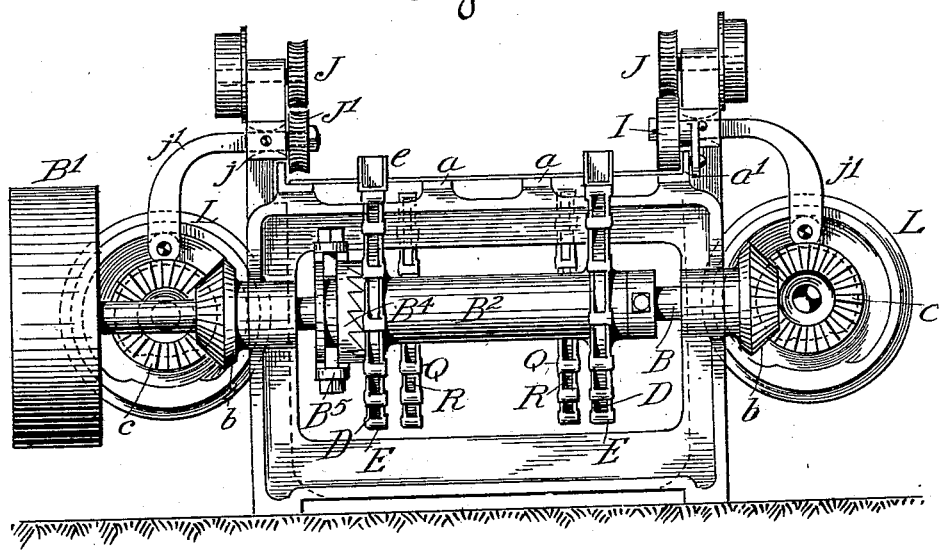
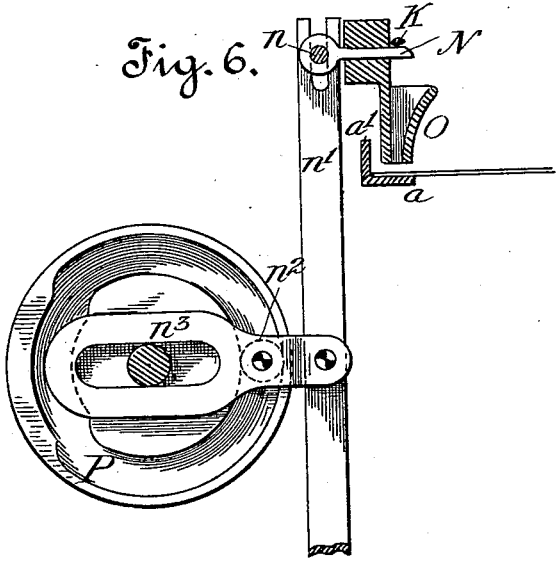
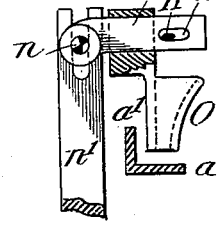
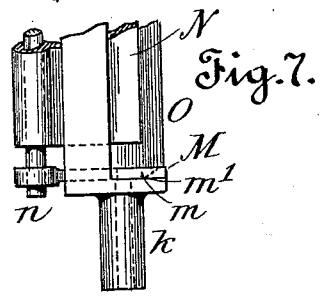

UNITED STATES PATENT OFFICE.

JOHN LEE, OF SAN FRANCISCO, CALIFORNIA, ASSIGNOR TO AMERICAN CAN COMPANY, OF JERSEY CITY, NEW JERSEY, A CORPORATION OF NEW JERSEY.

MACHINE FOR APPLYING SOLDER TO METAL BLANKS.

SPECIFICATION forming part of Letters Patent No. 705,937, dated July 29, 1902.

Application filed December 7, 1900. Serial No. 39,045. (No model.)

*To all whom it may concern:*

Be it known that I, JOHN LEE, a citizen of the United States, residing at San Francisco, in the county of San Francisco and State of California, have invented certain new and useful Improvements in Machines for Applying Solder to Metal Blanks, of which the following is a specification.

My invention relates to the manufacture of sheet-metal ware in which soldered joints are used. My object is to construct a machine for applying solder-wire to sheet-metal blanks before the latter are formed into can-bodies, such wires being deposited upon the blanks in lengths suitable for seams and then caused to adhere in the position in which they were deposited.

The embodiment of my invention shown in the accompanying drawings is a machine designed to apply and then affix lengths of solder wire or strip near but removed from two opposite edges of a blank for the purpose of subsequently making two soldered head-seam joints. A clear margin of unsoldered metal remains between the solder and the edge in proximity, so that the heads can be applied to the can-body without obstruction by the ridges of solder. The same or a similar machine can likewise be used for applying and fixing a single length of solder wire or strip adjacent to an edge of the blank for afterward forming the side seam.

Figure 1 is a side elevation. Fig. 2 is a continuation of the same side elevation and carries the construction to the discharge end. Figs. 1 and 2 should be read together. Fig. 3 is a plan view of the part of the machine shown in Fig. 1, the chute being omitted. Fig. 4 is an end view of the part of the machine shown in Fig. 1. Fig. 5 is an elevation of the solder-wire cutter. Fig. 6 is an elevation of the delivery device for the cut solder. Fig. 7 is a plan view of the parts shown in Figs. 5 and 6.

Figs. 1 and 2 taken collectively show the whole machine. A is a frame or table upon whose horizontal top are longitudinal strips $a$, which receive the blanks and upon which they are carried through the machine. At the inlet end of the machine is journaled a driving-shaft B, having a power-pulley B' and carrying the gears $b\ b'$, which through similar gears $c$ drive the longitudinal shafts C C continually. On a sleeve $B^2$, loose on the shaft B, are sprocket-wheels D D, from which chains E E extend to similar sprockets D' D' on a shaft $B^3$. Carriers $e$ on these chains extend up above the level of the surface which receives the blanks and propel them along. The loose sleeve $B^2$ is driven intermittingly by the shaft B through a sliding clutch $B^4$, feathered on said shaft and having a peripheral groove which receives the ends of a yoke $B^5$ on the lever F. This lever is pivoted at $f$, and its other end carries a roller which engages a cam-groove in a disk G on one of the shafts C. At proper times the clutch is disengaged and the sleeve, sprockets, and chains stop driving. The blanks are carried between side guides $a'$ on the outer guide-strips $a$, which extend throughout the machine, and the blanks are placed upon the guides automatically or by hand from the incline H at the inlet end.

The blanks are first carried beneath fluxing-rollers I and in contact with them, by which flux is applied to them in straight lines. Flux is delivered to the rollers from any suitable vessel. (Not shown.) Beyond the flux-roll is a pair of rollers J J' for feeding and somewhat flattening wire-solder. The solder-wire is shown at K entering between the rolls, whose peripheries are shaped substantially as in Fig. 4, the flattened solder being less liable to displacement after delivery on the blank than the round wire, or if flattened wire be originally fed the rolls J J' need only be feeding and not shaping rolls. The roll J is carried by a shaft which rotates steadily, a belt $J^2$ being indicated to cause such motion; but the roll J' is vertically movable, being journaled in a sliding box $j$. An arm $j'$ is connected to this box and also to the groove in the cam L on the shaft C, Figs. 1 and 4. The cam G, which controls the clutch, and the cam L, which controls the solder-feed, are timed to operate so as to stop the chains and the feed substantially at the same time. The feed-rolls deliver the wire through a guide-tube $k$, then through a slot $m$ in the cutter M, Fig. 5, and then directly upon the holders N, which normally protrude through the wall of the open solder-guide O, Fig. 6. The holders are carried by a pin $n$, engaged by the fork of a lever $n'$, pivoted below. This lever is rocked by the roller $n^2$, carried by the arm $n^3$ in the groove of a cam P. The cutter M is also mounted upon pin $n$ and also projects through the guide O. The cutting edge is indicated at $m'$, Fig. 7. The operation of these parts will be easily understood. While the blank is being propelled solder-wire is being fed by the rollers into position upon the holders, where it lies straight. The guide O is contracted at the bottom, which is in close proximity to and above the blank, but within the edge of the latter. The several cams have an ascertained relation to the length of the blank and the length of the solder which is to form the seam. When the blank is in proper position, the clutch is thrown out and the chains stop driving. An instant previous the cam L has separated the solder feed-rolls and that motion has ceased with the solder lying in position upon the holders. Then the cam P performs two simultaneous operations through the lever $n'$. It draws the cutter against the solder-wire and severs the right length of solder, while by the same motion the solder-holders are withdrawn and the now unsupported piece of solder falls through the guide O upon the blank, where it lies in proper position. If the subsequent can is to have two soldered ends or heads, the mechanism thus far described, excepting the cam G and its connections to the clutch, is duplicated on the other side of the machine, as shown in the drawings. The stoppage of the several feeds is but momentary, as the different cams, which revolve continuously, immediately put the feeds into operation again and bring another blank into position.

We now have a blank carrying one or two loose pieces of solder, which (if for head-seams) extend from near an end of the blank to near the opposite end. That they do not extend quite from end to end is because clear metal must be left from which to form the side seam. The position of the cutter in Fig. 1 relatively to the carrier $e$ beneath it shows this allowance for a clear margin, the carrier being supposed to abut against the edge of the blank. If solder is being placed in position for a side seam, it may extend quite from edge to edge or along the whole side seam, since it is destroyed in the operation of side-seam soldering, and so will not obstruct subsequent heading. Of course for a side seam only one side of an apparatus like that illustrated would be used. The subsequent movement of the blank with its loose solder is continuous, because it is my purpose to use as little solder as possible and to expose it only to sufficient heat to cause it to adhere to the blank. I therefore use a second pair of propelling-chains Q Q, driven by sprockets R R on shafts S S, which are geared directly to one of the continually-rotating shafts C. These chains, with carriers $q$, propel the blanks to the end of the machine, where, with the lines or ridges of solder attached, they are discharged to be formed into can-bodies at any future time. I have not considered it necessary to show a complete plan view of Fig. 2. The arrangement of chains and the manner of driving them are shown in Fig. 3, and it is easily understood that the parts shown in Fig. 2 may be duplicated on the other side of the machine, if desired. T and T' represent gas and air supply pipes, which cause gas and air to mingle in the horizontal pipe $T^2$, which has burners $t$ just above the lines of solder on the blank passing beneath it. The jets from pipe $T^2$ impinge against the strips of solder on the blank and cause them to adhere to the metal and still remain in substantially regular lines or ridges. Beyond the burner-pipe is a similarly-arranged cooling-pipe U, through a slot or holes in which air at normal temperature is blown immediately upon the heated solder. This pipe and the carrying-chains Q need extend only far enough to give the solder time to cool before the blank is discharged.

I do not limit myself to details of construction and arrangement described herein and shown in the drawings, as I desire to avail myself of such modifications and equivalents as fall properly within the spirit of my invention.

Having thus fully described my invention, what I claim as new, and desire to secure by Letters Patent, is—

1. In a machine for preparing blanks for the formation of soldered joints, the combination with means for holding or supporting a flat blank in a horizontal position, of parallel side guides for the ends of the blanks, and means for delivering one or more pieces of loose solder of proper length to form a seam, upon the surface of the blank, parallel and adjacent to but removed from the edges thereof, and means for causing said pieces to adhere in substantially the position in which they are delivered upon the blank.

2. In a machine for preparing blanks for the formation of soldered joints the combination with means for holding or supporting a flat blank in a horizontal position, and parallel side guides for the ends of the blanks, means for delivering a piece of loose solder of proper length to form a seam upon the surface of the blank parallel and adjacent to but removed from the edge thereof, and means for heating said piece and causing it to adhere in substantially the position in which it is delivered upon the blank.

3. In a machine for preparing blanks for the formation of soldered joints, the combination with a feed for a solder wire or strip, of a solder-cutter and means for supporting in a horizontal position a flat can-body blank beneath said cutter, and parallel side guides for the ends of the blank, whereby pieces of solder severed by said cutter fall upon said blanks.

4. In a machine for preparing blanks for the formation of soldered joints comprising means for propelling such blanks successively and flatwise in a horizontal position, parallel side guides for the ends of the blanks, means for feeding a solder-strip to a position above each blank, a solder-severing device, means for delivering the severed solder upon the surface of each blank, and means for heating and causing the solder-strip to adhere to each flat blank in substantially the position in which it is delivered upon the same, substantially as specified.

5. In a machine for preparing blanks for the formation of soldered joints, a guideway for said blanks, means intermittingly operated for propelling such blanks along it, an intermittingly-operated solder-feed, a solder-cutter, a support for the free end of the fed solder and means for removing said support so as to drop the severed piece upon the blank.

6. In a machine for preparing blanks for the formation of soldered joints, blank-propelling means intermittingly operated, a solder-strip feed intermittingly operated, a solder-cutter, a solder-support which receives solder from said feed, and maintains it above the blank, means for withdrawing said support and releasing the solder and a guide for delivering the severed solder in correct position upon the blank.

7. In a machine for preparing blanks for the formation of soldered joints, intermittingly-operated means for propelling a flat blank in a horizontal position, for feeding solder, for severing solder, and for delivering loose severed solder upon the surface of the blank, parallel and adjacent to but removed from the edges thereof, in combination with a heating device, and continuously-operating propelling means for conveying the blank carrying the loose solder in a horizontal position in proximity to the heating device, and parallel side guides for the ends of the blank.

8. In a machine for preparing blanks for the formation of soldered joints, the combination with the solder-wire feed, of a reciprocating cutter, a movable solder-holder, a solder-guide below the same, and mechanical connections for accomplishing operations of feeding the solder horizontally upon the holder severing a length of such solder, withdrawing the holder from beneath the solder, and so delivering a piece of solder through said guide.

9. In a machine for preparing blanks for the formation of soldered joints, the combination with a support upon which can-blanks lie and are propelled in a horizontal position, and side guides for the ends of the blanks, of an elongated solder-guide above the support having a contracted discharge in proximity to said support, and means for delivering lengths of solder-wire into said guide, which are thereby delivered in horizontal position upon the blanks adjacent to but removed from the edges thereof.

10. In combination with rolls arranged for feeding solder wire or strip horizontally, a cutter intermediate between said solder and rolls, and means for operating the cutter and releasing the piece of solder, thereby severed, from the holder, means for supporting and propelling flat blanks in a horizontal position, parallel side guides for the ends of the flat blanks, and a guide for the severed piece of solder, and means for heating the blanks and the solder-wire thereon and causing the solder to adhere to the blanks parallel and adjacent to but removed from the edges or seam-sections thereof, substantially as specified.

11. In a machine for preparing flat blanks for the formation of soldered joints, the combination with means for supporting and conveying the flat blanks in a horizontal position, of side guides for the ends of the blanks, means for delivering cut lengths of solder-wire adjacent to but removed from the edges of the blanks, and means for heating the blanks and the solder-strips thereon and causing the same to adhere thereto adjacent to but removed from the edges of the blanks, substantially as specified.

12. The combination with means for supporting the flat blank in a horizontal position, with means for flattening and delivering the solder-wire in cut lengths upon the flat blank adjacent to but removed from the edges thereof, and means for causing the cut lengths of solder-wire to adhere to the blank in positions adjacent to but removed from the edges thereof, substantially as specified.

13. The combination with a horizontal table for supporting flat blanks, of parallel side guides for the opposite ends of the blanks, means for conveying the blanks along the table, a pair of solder-wire-feed devices, a pair of cutters for the solder-wire, a pair of guides for delivering the cut lengths of solder-wire upon the blanks in position adjacent to but removed from the edges of the blanks, and means for causing the cut lengths of solder-wire to adhere to the blanks in such positions, substantially as specified.

14. The combination with a horizontal table for supporting flat blanks, of guides for the edges of the blank, means for conveying the blanks along the table, a pair of solder-wire feeding and flattening devices, a pair of cutters for the solder-wire, a pair of guides for delivering the cut lengths of solder-wire upon the blank in positions adjacent to but removed from the edges of the blank, and means for causing the cut lengths of solder-wire to adhere to the blank in such positions, substantially as specified.

15. The combination with means for supporting and conveying flat blanks in a horizontal position, a pair of parallel side guides for the ends of the blanks, of a solder-wire-feed device, a solder-wire cutter, and a guide for the cut lengths of solder-wire for delivering the same on the flat horizontal blanks in a position adjacent to but removed from the edges thereof, and a heating device, substantially as specified.

In testimony whereof I have affixed my signature, in presence of two witnesses, this 1st day of December, 1900.

JOHN LEE.

Witnesses:
L. W. SEELY,
F. M. BURT.